(No Model.)
J. H. STEELE.
BRICK CARRIER.
No. 416,430. Patented Dec. 3, 1889.
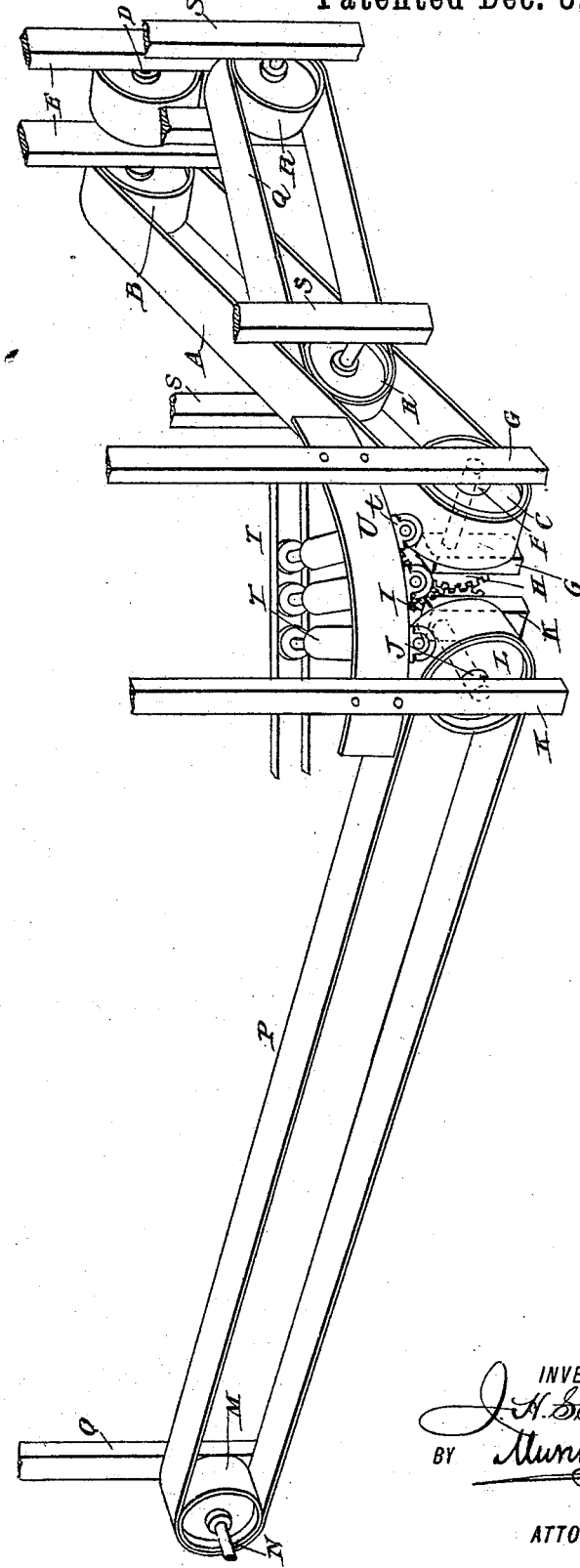

UNITED STATES PATENT OFFICE.

JAMES H. STEELE, OF BUTTE CITY, MONTANA.

BRICK-CARRIER.

SPECIFICATION forming part of Letters Patent No. 416,430, dated December 3, 1889.

Application filed May 8, 1889. Serial No. 310,039. (No model.)

*To all whom it may concern:*

Be it known that I, JAMES H. STEELE, of Butte City, in the county of Silver Bow and Territory of Montana, have invented a new and Improved Brick-Carrier, of which the following is a full, clear, and exact description.

The object of my invention is to provide a machine whereby molded bricks may be carried from the brick-press to the yard; and to this end my invention consists of a system of carrying-belts arranged and operated, as hereinafter described and claimed.

Reference is to be had to the accompanying drawing, forming a part of this specification, in which the figure is a perspective view of my brick-carrier.

A represents a belt of suitable width—say from twelve to fourteen inches—placed on the two pulleys B C. The pulley B is made fast to the drive-shaft D, journaled in uprights E E. The pulley C is made fast upon the shaft F, held in the uprights G G, and on the outer end of said shaft is secured the gear-wheel H. This meshes with the gear-wheel I, secured on the shaft J, held in the uprights K K. On this shaft is secured a pulley L, which corresponds with the pulley M on shaft N, held in suitable uprights O. Upon the pulleys L M is placed the belt P, for carrying bricks out into the brick-yard.

Q is a side belt on pulleys R R, held on shafts held in suitable uprights S S. This belt Q joins belt A and is adapted to carry bricks thereto, so that bricks may be placed either on belt A directly or on belt Q.

At the angle formed by the belts A P is placed the curved guide U, so that as the bricks are carried down by the belt A they will be shifted by the guide to the series of small rollers T and by them transferred to the belt P. The said rollers T are held in the frame-work at one end and in the bearing *t* at the other, as shown clearly in the drawing.

The belt P may be placed to reach any desired part of the yard, so that by this carrier the molded bricks as they are taken from or as they issue from the brick-press have simply to be placed on the belt A or Q and they will be carried to the end of the belt P and there deposited.

Having thus described my invention, what I claim as new, and desire to secure by Letters Patent, is—

1. A brick-carrier comprising the belts A P and means for revolving the pulleys on which they are placed, in combination with a guide, and a series of transfer-rollers at the contiguous ends of the said belts, substantially as described.

2. The combination, with the belts A P, of the side belt Q, joining the belt A, substantially as described.

3. The belt A on pulleys B C, and the belt P on pulleys L M, in combination with the gear-wheels H I on the shafts of the pulleys C L, substantially as described.

JAMES H. STEELE.

Witnesses:
THEODORE M. CARR,
SIMON JACOBS.